United States Patent [19]

Balabanova

[11] Patent Number: 4,493,492

[45] Date of Patent: Jan. 15, 1985

[54] FOLDABLE MULTI-FUNCTIONAL CARRIAGE

[76] Inventor: Tzvetanka Balabanova, 15 Rue du Parc Montsouris, 75014 Paris, France

[21] Appl. No.: 360,992

[22] Filed: Mar. 23, 1982

[30] Foreign Application Priority Data

Mar. 27, 1981 [FR] France ................. 81 06245

[51] Int. Cl.$^3$ ............................................. B62B 3/02
[52] U.S. Cl. ................................. 280/651; 15/260; 280/47.37 R; 280/79.1 A
[58] Field of Search ............... 280/38, 39, 639, 640, 280/47.37 R, 47.35, 47.36, 33.99 R, 35, 651, 47.19; 248/91, 95, 110, 113, 129, 150, 353; 15/264, 260, 262

[56] References Cited

U.S. PATENT DOCUMENTS

| | | | |
|---|---|---|---|
| 1,358,235 | 12/1920 | Nylin | 280/651 |
| 1,961,394 | 6/1934 | Rothe | 280/47.35 |
| 2,141,881 | 12/1938 | Schray | 280/47.35 |
| 2,284,801 | 6/1942 | Conger | 280/651 |
| 2,419,422 | 4/1947 | Schulein | 280/651 |
| 2,596,749 | 5/1952 | Webber | 280/47.35 |
| 3,806,146 | 4/1974 | Shaw | 248/95 |

FOREIGN PATENT DOCUMENTS 94488  8/1969  France ................. 280/79.1

Primary Examiner—David M. Mitchell
Attorney, Agent, or Firm—Yount & Tarolli

[57] ABSTRACT

The present invention relates to a foldable multifunctional carriage, particularly for use in performing cleaning and maintenance tasks in hospitals, of the type comprising rollers on which are mounted a rigid portion and a foldable framework which can be placed either in an operative unfolded position or in an inoperative folded position.

The carriage is characterized in that said rigid portion consists of a chassis (2) horizontally resting on said rollers (3), and in that said framework (1) has a pair of arms (4, 5) pivotally mounted on a front portion of said chassis (2), a U-shaped frame (7) being pivotally mounted between said pair of arms so as to form a strut adapted to abut against a stop (12) integrally formed with said chassis (2) to secure said framework (1) in its unfolded position, said pair of arms (4, 5) carrying, therebetween, if desired, one or more support members (8, 36, 37) for articles or utensils to be carried on the carriage.

18 Claims, 6 Drawing Figures

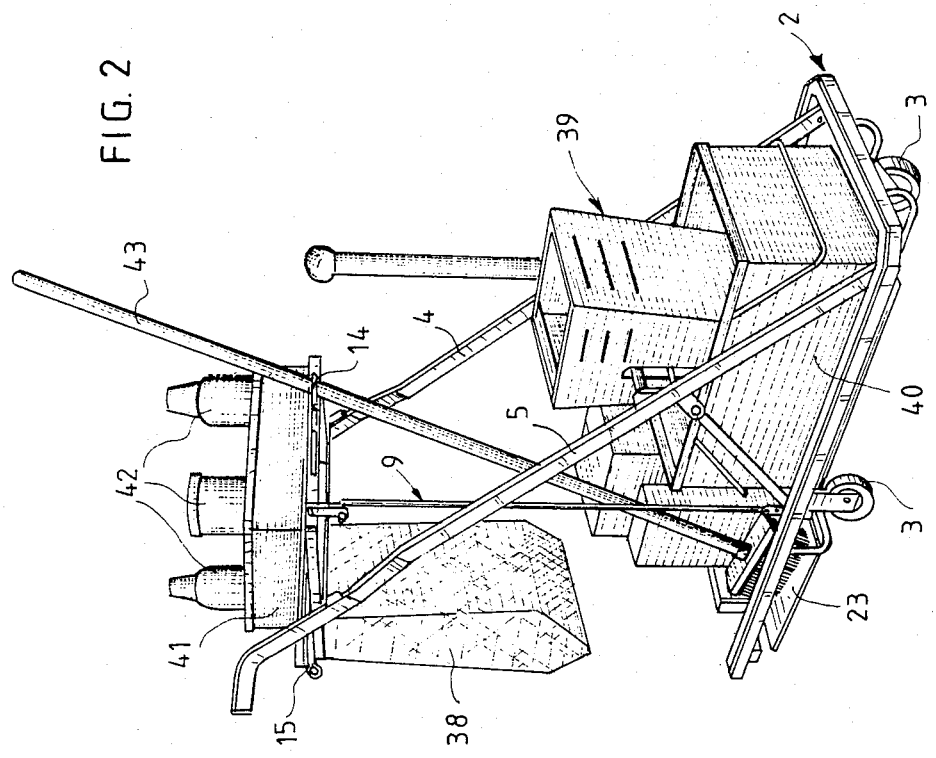
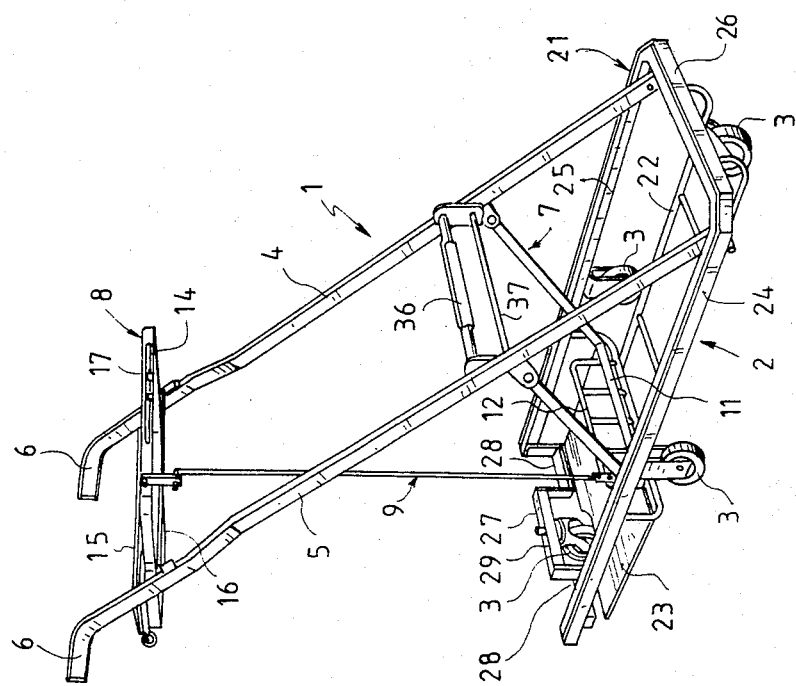

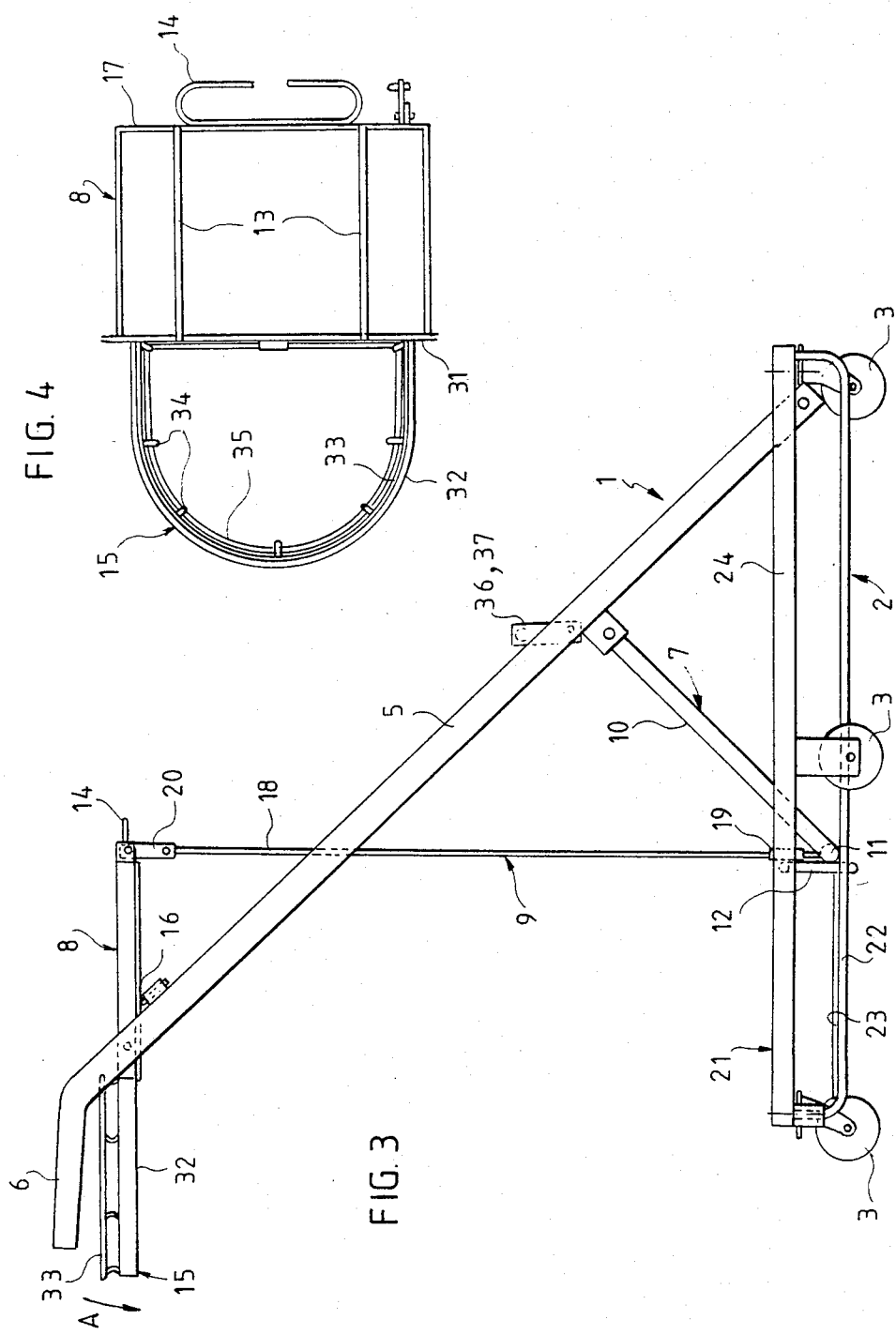

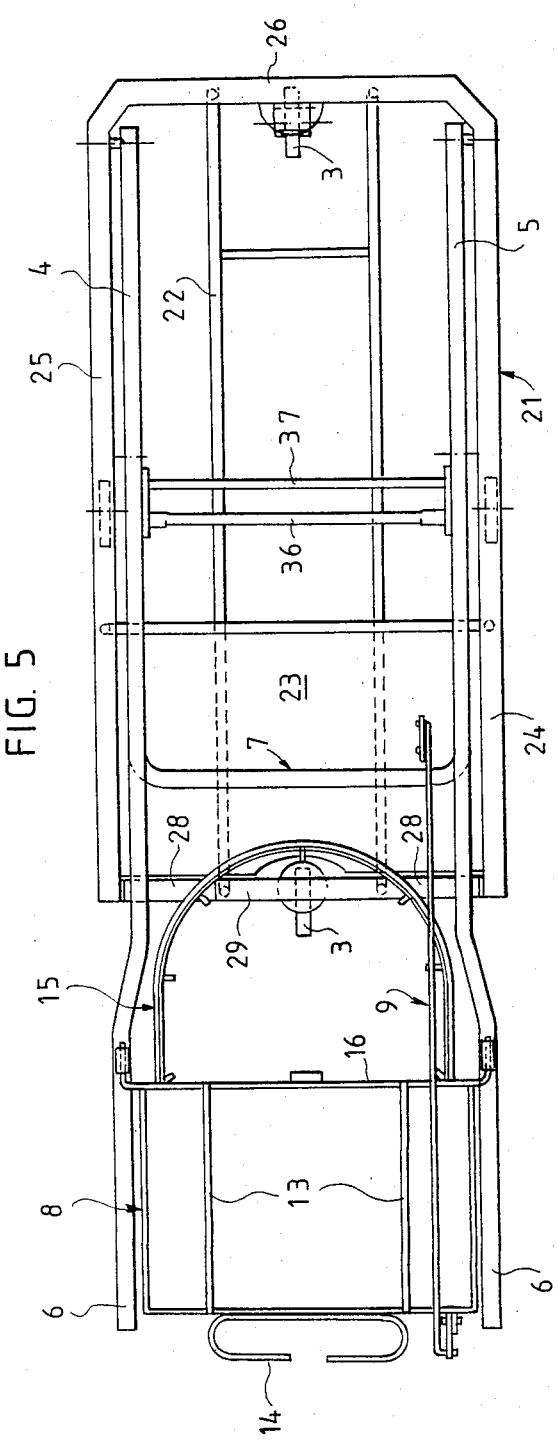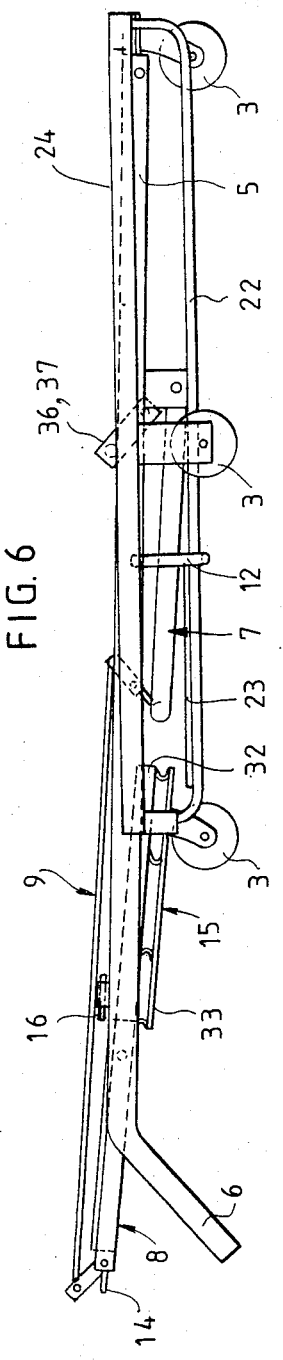

FOLDABLE MULTI-FUNCTIONAL CARRIAGE

BACKGROUND OF THE INVENTION

The present invention relates to a foldable multifunctional carriage, particularly for use in performing cleaning and maintenance tasks in hospitals or any other large-area public or private building, said carriage comprising rollers on which are mounted a rigid portion and a foldable framework which can be placed either into an operative unfolded position or an inoperative folded position.

Maintenance and cleaning tasks in large-area buildings often include a sequence of individual tasks each requiring proper utensils and accessories. As an example, in hospitals and collective restaurants, these tasks consist in sweeping floor, then cleaning it with water, dusting furniture, emptying garbage bins, etc. In order to be able to perform these various tasks, the housekeeper in charge of the cleaning tasks should permanently have at her immediate disposal various utensils and accessories which may be heavy and cumbersome, such as brooms, floor cloth, water pails, manually-operated wringing machine, bags for garbage, flasks of various household products and the like. For such a purpose, the housekeeper is equipped with a carriage on which all the above articles can be grouped together.

So as to impart them maximum capacity, known carriages used for the above purposes have been given a relatively bulky construction, which renders them heavy and uneasy to handle. In addition, these carriages are cumbersome and, since a great number, sometimes several tens, of them are used in a single hospital or restaurant, it is further necessary to provide a large-area room for storing or parking them, which is particularly disadvantageous, especially because of the relatively high cost of built floor areas in hospitals.

The latter problem has been in part overcome by the commercial production of foldable carriages. However, in order to be able to give a foldable construction to such carriages, their capacity must be reduced. Furthermore, it is rather uneasy to fold them back, and such a folding is not sufficiently satisfactory for storing the carriages in the smallest possible space area.

SUMMARY OF THE INVENTION

The present invention has for its object to overcome the above drawbacks, and provides therefore a foldable multifunctional carriage of the above-said type, which is characterized in that its rigid portion consists of a chassis horizontally resting on rollers, and in that its framework has at least two arms pivotally mounted on said chassis, a U-shaped frame being pivotally mounted between these two arms so as to form a strut adapted to abut against a stop integrally formed with said chassis to secure said framework in its unfolded position, said two arms carrying therebetween, if desired, one or more support members for articles or utensils to be carried on the carriage.

While being of a quite open construction which renders it relatively light and hence easy to handle, the carriage in accordance with the invention can carry on its chassis and, if desired, on the support members adapted to be mounted between the pair of arms, a number of utensils, accessories and the like. For such a purpose, the support members may consists in removable baskets or trays. The trays may be hinged between the pair of arms and foldable in the plane of the latter.

Another advantage of this carriage resides in the fact that it can easily be folded by simply laying its arms down on the chassis, if necessary after having removed the removable baskets or trays or pivoted the hinged trays into the plane of the arms. A particularly interesting additional advantage resides in the fact that, when it is in a such folded position, the carriage occupies a very small space substantially corresponding to the thickness of its chassis. There results therefrom a considerable space saving whenever a number of carriages of the same type are stored or parked in a single room.

Advantageously, the carriage arms extend in directions substantially parallel to each other and have their free ends bent to form handles by means of which the carriage can be manually controlled.

In accordance with an important feature of the invention, the carriage framework is pivotably mounted on the front portion of the chassis and comprises a support member for a removable, manually operated wringing machine, which member consists of a pair of parallel tubes connected at their respective ends by a pair of mounting blocks, said support member being secured between the pair of arms at the pivoting point of said U-shaped frame, while being positioned so that both tubes extend one over the other in a plane perpendicular to the plane of the chassis when the framework is in its unfolded position, the upper tube being further flattened in said plane containing both tubes.

Due to the above arrangement, the carriage in accordance with the invention forms a support for a manually-operated wringing machine and which not only is movable and foldable but also is adapted to withstand the high stresses imposed thereon upon handling of the wringing machine.

In accordance with another important feature of the invention, the framework includes as said support members one or more rectangularly-shaped frames each carrying a support tray and pivotally mounted between the pair of arms, said rectangular frame(s) and the U-shaped frame being successively connected by an articulated linkage.

As a result of such a particular construction, the carriage framework can be very rapidly folded over the frame in a reduced number of steps. For this purpose, it suffices to apply a pulling force upwardly onto the pair of arms, which instantly releases the strut from the corresponding stop, and then the frame proximate of the free ends of the arms is caused to pivot which automatically brings, through an articulated linkage, the other frames, including said strut, into the arm plane, the thus folded framework being afterwards laid down upon the chassis.

In a preferred embodiment the framework comprises only one rectangular frame and the articulated linkage consists of at least three link elements pivoted end-to-end on each other, and is mounted between the support branch or leg of said U-shaped frame and the one branch of said rectangular frame which extends parallel to the pivot pin thereof and is located on the other side of the plane arm with respect to said support branch of said U-shaped frame.

Preferably, a support rod is secured between the pair of arms to provide a support for the rectangular frame when the framework is in its unfolded position. Due to this arrangement, the rectangular frame is stiffened and stabilized in its operative unfolded position.

Advantageously, the rectangular frame further extends, on its branch opposite to the one which is connected to the articulated linkage, into a substantially semi-circularly shaped support which includes about its periphery means for attaching a collapsible bag such as a garbage bag.

In addition, the rectangular frame has on its branch connected to the articulated linkage, a C-shaped retaining means into which the handles of brooms the brushes of which lie on the frame can be placed.

In a preferred embodiment, the chassis comprises a platform hanging on to a frame-shaped skeleton on which are mounted the carriage rollers, said skeleton consisting of a pair of longitudinal legs through which the arms are inwardly pivoted on the skeleton, and of a pair of transverse legs one of which includes yokes for accomodating the arms in their unfolded position. Thus, the frame forms by itself a hollow support for accessories such as water pails and, through the yokes, the framework can be nested in the folded position into the frame without any laterally projecting parts being dangerous upon handling of the folded carriage.

Advantageously, the carriage in accordance with the invention includes locking means for securing the framework in the folded position with respect to the chassis.

BRIEF DESCRIPTION OF THE DRAWINGS

An embodiment of the present invention will be described hereinafter as a non-limitative example, with reference to the accompanying drawings in which:

FIG. 1 is a perspective view of a carriage in accordance with the invention in its operative unfolded position, FIG. 2 is a view of the carriage as shown in FIG. 1, when provided with its cleaning and maintenance accessories, FIG. 3 is a side view, in an enlarged scale, of the carriage of FIG. 1, FIG. 4 is a top view of the rectangular support tray of the carriage, FIGS. 5 and 6 are top and side views, respectively, of the carriage in accordance with the invention in its inoperative, folded position.

DESCRIPTION OF PREFERRED EMBODIMENTS

The foldable, multi-functional carriage which is shown in its unfolded position in FIGS. 1 and 3 essentially consists of a foldable framework mounted on a rigid chassis 2 horizontally resting upon rollers 3.

More specifically, framework 1 consists of a pair of substantially parallel arms 4,5 which are pivoted at one end thereof on the front portion of chassis 2. At their free ends, both arms 4,5 have bent handles 6 by means of which the carriage can be manually controlled.

As shown in FIGS. 1 and 3, a U-shaped frame 7 is pivotally mounted through the free ends of its side legs 10 between arms 4,5 of the framework at the lower ends thereof.

Frame 7 acts as a strut securing framework 1 in its unfolded position by abutting through its center leg 11 against a stop 12 integrally formed with chassis 2.

Also, a rectangular frame 8 is pivotally mounted about one of its middle symmetrical axes between the pair of arms 4, 5, adjacent handles 6 thereof, rectangular frame 8 being connected to U-shaped frame 6 by an articulated linkage 9. As more clearly shown in FIG. 4, rectangular frame 8 includes center spacers 13 which impart thereto a supporting tray construction and is further provided with attachment and retaining members 14, 15 for various accessories, the construction and function of which will be described hereinbelow. In its unfolded position, rectangular frame 8 rests upon a support rod 16 secured between the pair of arms 4, 5.

Articulated linkage 9 which has been referred to hereinabove is mounted between the center support leg 11 of U-shaped frame 7 and leg 17 of rectangular frame 8 which extends parallel to the pivot axis thereof and is located on the other side of the plane of arms 4, 5 with respect to support leg 11 of the U-shaped frame. For obvious reasons resulting from the desirability to maximize the carriage loading capacity, articulated linkage 9 is provided adjacent one of arms 4, 5. As more distinctly shown in FIG. 3, articulated linkage 9 consists of three link elements which are pivoted end-to-end on each other, namely an elongated rod 18 connected at each end thereof to links 19, 20, respectively, which are in turn pivoted on respective legs 11 or 17 of the frames 7, 8, respectively.

Turning again to FIG. 1, it is shown that chassis 2 of the carriage in accordance with the invention consists of a frame-shaped skeleton 21 resting upon rollers 3 and to which hangs on a metal structure 22 carrying a platform 23. Skeleton 21 consists of a pair of longitudinally extending legs 24, 25 on which arms 4, 5 are respectively pivoted, inwardly of skeleton 21, and of a pair of transversely extending legs 26, 27. The rear transverse leg 27 includes yokes 28 which, as described hereinbelow, allow passage therethrough of arms 4, 5 in the folded position, yokes 28 defining a projecting portion 29. It will be appreciated here that rollers 3 are respectively secured to the middle point of legs 24, 25, 26 and 27 of skeleton 21.

In FIG. 4 showing rectangular frame in a top view, are shown in detail members 14, 15 which have been referred to hereinabove. Member 14 is a C-shaped retaining means outwardly welded to frame 8 on leg 17 thereof. As to member 15, it consists of a substantially semicircularly-shaped support which extends from frame 8 on its opposite leg 31. Support 15 includes a pair of arcuate members 32, 33 which are superimposed to each other and connected through outwardly opening rings 34 which define a groove within which an elastic string 35 is accommodated.

Advantageously, the carriage in accordance with the invention includes a support member for a removable, manually-operated wringing machine 39 of a known per se type. It should be apparent from FIG. 1 that this support member consists of a pair of parallel tubes 36, 37 connected at their respective ends by a pair of mounting blocks. The wringer support is welded through this pair of mounting blocks between the pair of arms 4, 5 of framework 1, at the pivot point of U-shaped frame 7. The support is positioned so that, whenever framework 1 is in its unfolded position, both tubes 36, 37 extend one over the other in a plane perpendicular to the chassis plane. In addition, the upper tube 36 is flattened in the plane of both tubes.

The carriage in accordance with the invention provides, due to the above arrangement, a movable and foldable wringer support particularly useful in hospitals. By conveniently selecting the length and incline of strut 7 and the location of the pivot points thereof on arms 4, 5, in combination with the particular location of the rollers, there is achieved a wringer support able to withstand the particularly high stresses imposed thereon upon handling of the wringing machine.

It should be noted here that, depending upon the specific maintenance tasks in each particular hospital, the carriage in accordance with the invention may be used only as a wringer support and, in such an instance, it is not necessary to provide it with any supporting trays.

Referring to FIG. 2, it can be see, how the carriage in accordance with the invention can be used in maintenance and cleaning tasks. The two-arcuate member support 15 enables attachment of a garbage bag 38 which is held in place by elastic string 35. A tub or bucket 40 having a clean water compartment and a soiled water compartment is installed on platform 23 of chassis 2 immediately below wringing machine 39. A trough 41 is disposed on rectangular frame 8 for accommodating various articles such as flasks 42 of household products. Platform 23 may also be used for this purpose, while C-shaped retaining means 14 acts to retain the handles of brooms 43 the brushes of which lie on platform 23. Thus, it can be appreciated that the carriage in accordance with the invention has a very high loading capacity and can accommodate all kinds of various articles or accessories.

The loading capacity of the carriage in accordance with the invention can be further increased by adding further support elements thereto. Thus, at least one further pivoting rectangular frame carrying a tray and connected to frames 7 and 8 by pivoted links similar to linkage 9 can be mounted between arms 4,5 of framework 1. Provision of several pivoting frames is of interest in collective restaurants for carrying so-called "meal trays".

The method of folding of the carriage in accordance with the invention will now be described with reference to FIGS. 3, 5 and 6.

Firstly, arms 4 and 5 are slightly raised so as to release U-shaped frame 7 forming a strut from stop 12. Thereafter, rectangular frame 8 is pivoted in the direction of arrow A in FIG. 3 to bring it substantially into the plane of arms 4, 5. By means of its articulated linkage 9, U-shaped frame 7 pivots in the opposite direction and comes into the same plane. Afterwards, it will suffice to lay framework 1 thus folded down over chassis 2, as shown in FIGS. 5 and 6, arms 4, 5 being engaged into yokes 28 of skeleton 21.

Once framework 1 is in the latter position, twoarcuate member support 15 of rectangular frame 8 comes into frictional abutment against the side edges of projecting portion 29 of frame 2, which insures locking of framework 1 in the folded position over chassis 2, whereby the folded carriage can be safely handled without any danger of the framework being opened up. Alternatively, said locking means may be a manually-operated lock mounted on one of arms 4, 5 and cooperating with the support leg of yoke 28 into which it engages in the folded position.

To place the carriage into its operative, unfolded position, the various steps hereinabove described are carried out in the reverse order.

It can be appreciated by referring to FIG. 6 that the folded carriage has a thickness substantially equal to the thickness of its chassis 2, which is of about 12 cm in practical instances.

As a result, the floor space it requires is minimized, which of course results in considerable space savings when several carriages of the same type are parked in a room.

An additional advantage is that the carriage has in its unfolded shape a quite open or perforated construction which renders it particularly light and easy to handle.

It can also be appreciated that framework 1 may comprise more than two arms, each pair of two adjacent arms being equipped with support members in the same way as the hereabove described single pair of arms 4,5.

I claim:

1. A multi-functional carriage, particularly for use in performing cleaning and maintenance tasks in hospitals, said carriage comprising a rigid chassis having stop means, rollers supporting said rigid chassis and a foldable framework mounted on said rigid chassis so as to be foldable between an operative, unfolded position and an inoperative, folded position, said framework having at least two arms pivotally mounted on said chassis, and a strut frame pivotally mounted between said two arms so as to form a strut adapted to abut against said stop means to maintain said framework in its unfolded position, said two arms carrying therebetween support means for carrying articles or utensils on said carriage, said support means including at least wringer support means for supporting a removable, manually-operated wringing machine, said wringer support means being fixedly connected to said two arms adjacent the pivot points of said strut frame thereon.

2. A multi-functional carriage according to claim 1, wherein said wringer support means include parallelly extending tubes, a pair of mounting blocks disposed at opposite ends of said tubes and connecting said tubes, said mounting blocks each being connected with one of said arms adjacent the pivot point of said strut frame, said tubes extending one over the other in a plane perpendicular to the plane of said chassis whenever said framework is in its unfolded position, the upper one of said pair of tubes being flattened in said plane of said tubes.

3. A multi-functional carriage, particularly for use in performing cleaning and maintenance tasks in hospitals, said carriage comprising a rigid chassis having stop means, rollers supporting said rigid chassis and a foldable framework mounted on said rigid chassis so as to be foldable between an operative, unfolded position and an inoperative, folded position, said framework having at least two arms pivotally mounted on said chassis, and a strut frame pivotally mounted between said two arms so as to form a strut adapted to abut against said stop means to maintain said framework in its unfolded position, said two arms carrying therebetween support means for carrying articles or utensils on said carriage, said support means including at least one support frame for carrying a support tray, said frame being pivotally mounted between said pair of arms, and linkage means connecting said support frame and said strut frame for moving said support tray between a position generally parallel with said chassis and transverse to said arms when said framework is in said unfolded, operative position and a position in which said support tray is generally lying in the plane of said arms when said framework is in said folded, inoperative position.

4. A multi-functional carriage according to claim 3 wherein said linkage means includes at least three link elements pivoted end-to-end to each other, said linkage means being mounted between a support leg of said strut frame and a leg of said support frame which extends in a direction parallel to the pivot axis thereof and is located on the opposite side of the plane of said arms with respect to said support leg of said strut frame.

5. A multi-functional carriage according to claim 4, further including a support rod secured between said pair of arms for supporting said support frame when said framework is in its unfolded position.

6. A multi-functional carriage according to claim 4, further including a substantially semi-circularly shaped bag support, said bag support having around it periphery attachment members for a collapsible bag, said bag support being connected with a leg of said support frame opposite to the one which is connected to said articulated linkage.

7. A multi-functional carriage according to claim 6, wherein said bag support includes a pair of arcuate members which are superimposed to each other and connected by outwardly open rings which define a groove for receiving an elastic string.

8. A multi-functional carriage according to claim 5 further including utensil holding means including a C-shaped member connected with said leg of said support frame to which said linkage means is connected.

9. A multi-functional carriage according to claim 8 wherein said chassis includes a pair of longitudinally extending, parallel frame members, and a pair of transverse, parallel frame members connected with said longitudinal frame members, and a platform extending between and connected with said frame members, one of said transverse frame members having yokes for accommodating said arms in their folded position.

10. A multi-functional carriage according to claim 9, including locking means for securing said framework in its folded position with respect to said chassis.

11. A multi-functional carriage, particularly for use in performing cleaning and maintenance tasks in hospitals, said carriage comprising a rigid chassis, rollers mounted on said rigid chassis and a foldable framework foldable between an operative, unfolded position and an inoperative, folded position, said rigid chassis extending horizontally and resting on said rollers, said framework having two arms pivotally mounted on a front portion of said chassis, a stop integrally formed with said chassis, a U-shaped frame having distal ends pivotally mounted between said two arms so as to form a strut adapted to abut against said stop to maintain said framework in its unfolded position, said two arms carrying therebetween support means for carrying articles or utensils on said carriage, said support means including wringer support means for supporting a removable, manually-operated wringing machine, said wringer support means including a pair of parallelly extending tubes, a pair of mounting blocks disposed at opposite ends of said tubes and connecting said tubes, said mounting blocks each being connected with one of said arms at the pivot point of said U-shaped frame, said tubes extending one over the other in a plane perpendicular to the plane of said chassis whenever said framework is in its unfolded position, the upper one of said pair of tubes being flattened in said plane of said tubes, and said support means including a rectangular frame for carrying a support tray, said frame being pivotally mounted between said pair of arms, and linkage means connecting said rectangular frame and said U-shaped frame for moving said support tray between a position generally parallel with said chassis and transverse to said arms when said framework is in said unfolded, operative position and a position in which said support tray is generally parallel with said arms when said framework is in said folded, inoperative position.

12. A multi-functional carriage according to claim 11 wherein said linkage means includes at least three link elements pivoted end-to-end to each other, said linkage means being mounted between a support leg of said U-shaped frame and a leg of said rectangular frame which extends in a direction parallel to the pivot axis thereof and is located on the opposite side of the plane of said arms with respect to said support leg of said U-shaped frame.

13. A multi-functional carriage according to claim 12, further including a support rod secured between said pair of arms for supporting said rectangular frame when said framework is in its unfolded position.

14. A multi-functional carriage according to claim 12, further including a substantially semi-circularly shaped bag support, said bag support having around its periphery attachment members for a collapsible bag, said bag support being connected with a leg of said rectangular frame opposite to the one which is connected to said articulated linkage.

15. A multi-functional carriage according to claim 14, wherein said bag support includes a pair of arcuate members which are superimposed to each other and connected by outwardly open rings which define a groove for receiving an elastic string.

16. A multi-functional carriage according to claim 13, further including utensil holding means including a C-shaped member connected with said leg of said rectangular frame to which said linkage means is connected.

17. A multi-functional carriage according to claim 16 wherein said chassis includes a pair of longitudinally extending, parallel frame members, and a pair of transverse, parallel frame members connected with said longitudinal frame members, one of each of said rollers being connected with one of each of said frame members, and a platform extending between and connected with said longitudinal frame members, one of said transverse frame members having yokes for accommodating said arms in their folded position.

18. A multi-functional carriage according to claim 17, including locking means for securing said framework in its folded position with respect to said chassis.

* * * * *